(12) United States Patent
Breuer et al.

(10) Patent No.: US 10,069,572 B1
(45) Date of Patent: Sep. 4, 2018

(54) DECODING LIGHT-BASED COMMUNICATION SIGNALS CAPTURED WITH A ROLLING SHUTTER IMAGE CAPTURE DEVICE

(71) Applicants: Christian Breuer, Dortmund (DE); Barry Stout, Beverly, MA (US); Anant Aggarwal, Waltham, MA (US)

(72) Inventors: Christian Breuer, Dortmund (DE); Barry Stout, Beverly, MA (US); Anant Aggarwal, Waltham, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/697,575

(22) Filed: Sep. 7, 2017

(51) Int. Cl.
*H04B 10/67* (2013.01)
*H04B 10/118* (2013.01)
*H04N 5/235* (2006.01)

(52) U.S. Cl.
CPC .......... *H04B 10/67* (2013.01); *H04B 10/118* (2013.01); *H04N 5/2353* (2013.01)

(58) Field of Classification Search
CPC ..... H04B 10/67; H04B 10/118; H04N 5/2353

USPC ........................................................ 398/118
See application file for complete search history.

(56) References Cited

U.S. PATENT DOCUMENTS

| 2014/0125852 | A1  | 5/2014  | Baer et al. |           |
|--------------|-----|---------|-------------|-----------|
| 2015/0280823 | A1* | 10/2015 | Breuer      | H04B 10/1149 |
|              |     |         |             | 398/25 |
| 2015/0311977 | A1* | 10/2015 | Jovicic     | H04B 10/116 |
|              |     |         |             | 398/106 |
| 2016/0323035 | A1* | 11/2016 | Jovicic     | H04B 10/0795 |
| 2017/0061900 | A1* | 3/2017  | Ueki        | G09G 3/20 |
| 2017/0148310 | A1* | 5/2017  | De Bruijn   | G08C 23/04 |
| 2017/0272376 | A1* | 9/2017  | Davies      | H04L 47/624 |
| 2018/0091221 | A1* | 3/2018  | Bitra       | H04B 10/116 |

* cited by examiner

*Primary Examiner* — Dalzid Singh
(74) *Attorney, Agent, or Firm* — Yutian Ling

(57) ABSTRACT

Methods and systems are described for sampling an LCom message and accurately decoding the entire LCom message using a light receiver (e.g., digital camera) of a typical mobile computing device, such as a smartphone, tablet, or other mobile computing device. In one embodiment, a curvature method is disclosed to determine LCom signal bit values from a curvature value of a running average calculation of light sensor data. In another embodiment, a signal reconstruction method is disclosed to determine LCom signal bit values from a comparison of modeled data buffers to light sensor data.

24 Claims, 11 Drawing Sheets

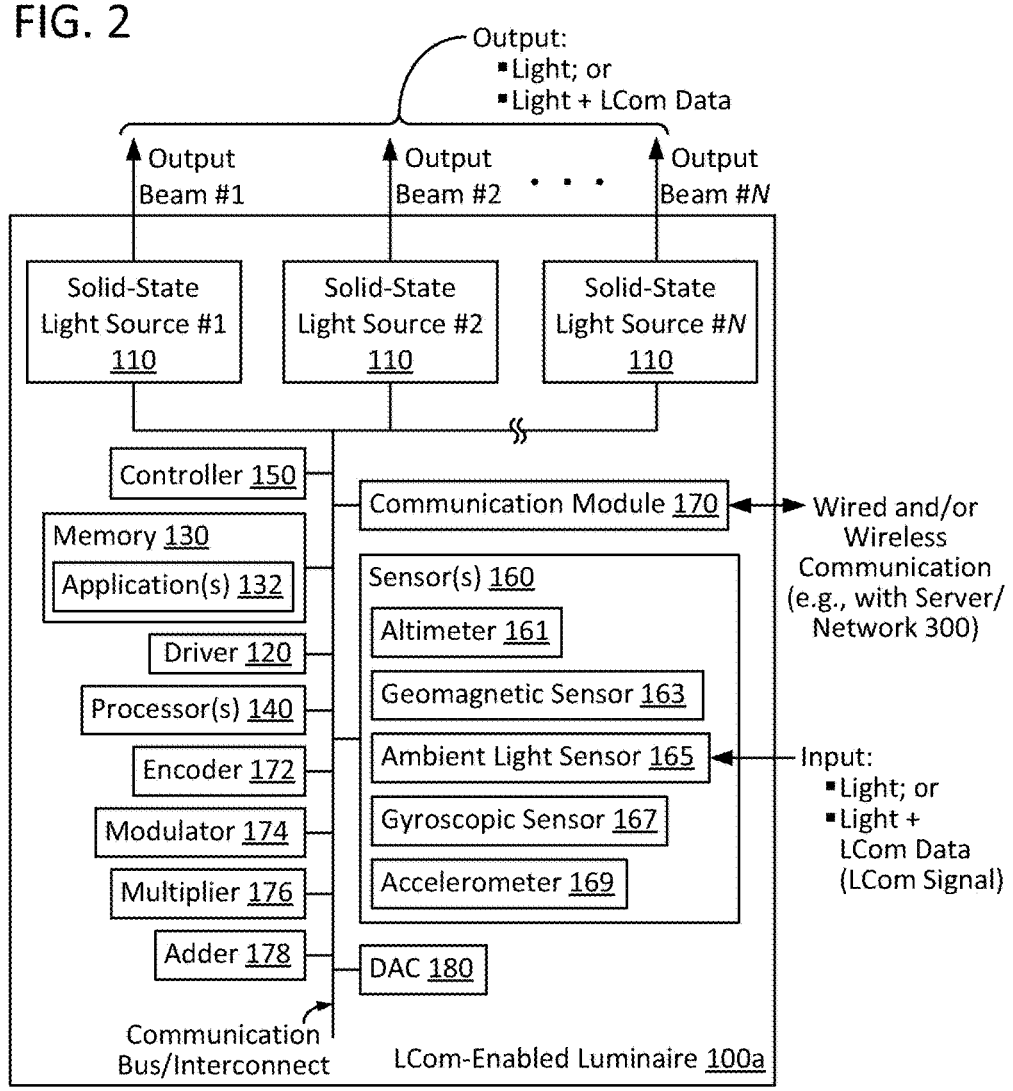

DECODING LIGHT-BASED COMMUNICATION SIGNALS CAPTURED WITH A ROLLING SHUTTER IMAGE CAPTURE DEVICE

FIELD OF THE DISCLOSURE

The present disclosure generally relates to the field of decoding light-based communication signals. In particular, the present disclosure is directed towards decoding light-based communication signals captured with a rolling shutter image capture device.

BACKGROUND

Light-based communication (LCom) generally refers to data communication in which light is encoded with information. Light receivers such as cameras on computing devices such as mobile phones and tablets can be used to receive an encoded light signal for decoding the signal. The light receivers on many computing devices have rows of light collecting pixels that collect light measurements in sequential order in time. More than one row of pixels, however, typically collect light at the same time in an overlapping fashion. This overlapping characteristic creates an effective running average through the light data received by the light receiver, often resulting in under sampling, thereby impairing the ability to accurately decode the signal.

SUMMARY OF THE DISCLOSURE

In one embodiment, the present disclosure is directed to a method for decoding a light-based communication (LCom) signal utilizing a rolling shutter light receiver having overlapping raster lines. The method includes receiving light data encoded with the LCom signal, storing a portion of the light data in a data buffer as the light data is received, in which the portion of the light data includes an exiting bit in the data buffer and an entering bit in the data buffer, determining a curvature of the data buffer, and determining a value of the entering bit in the portion of the light data based at least in part on the curvature.

In some embodiments, the method further includes determining whether an exposure time duration of the overlapping raster lines is an integer multiple of a bit period of the LCom signal, determining the value of the entering bit based on the curvature in response to determining that the exposure time duration of the overlapping raster lines is not an integer multiple of the bit period. In some embodiments, the method further includes determining the value of the entering bit based on the curvature and the value of the exiting bit in response to determining that the exposure time duration of the overlapping raster lines is an integer multiple of the bit period. In some embodiments, a value of the exiting bit is determined from measuring a first bit value captured by the light receiver following an extended idle period in the LCom signal. In some embodiments, the method further includes calculating a threshold value for determining whether the curvature is flat or changing, and comparing the threshold value to the calculated curvature to determine the curvature. In some embodiments, the method further includes determining whether the LCom signal is encoded with an average-to-idle encoding scheme. In some embodiments, determining the curvature of the data buffer includes calculating a running average of a value of the exiting bit and a value of the entering bit, and determining whether the running average is flat, a positive peak, or a negative trough. In some embodiments, determining the curvature of the data buffer further includes calculating a threshold value for determining whether the curvature is flat or changing, and comparing the threshold value to the running average to determine the curvature.

Additional embodiments of the present disclosure are directed to a method for decoding a light-based communication (LCom) signal utilizing a rolling shutter light receiver having overlapping raster lines. The method includes configuring a plurality of modeled data buffers, in which each of the plurality of modeled data buffers has a length based on an exposure time duration of the overlapping raster lines, initializing a first portion of each of the plurality of modeled data buffers with a first portion of the LCom signal, filling a second portion of each of the plurality of modeled data buffers with a possible signal value, in which each of the plurality of modeled data buffers has a different possible signal value in the second portion, calculating a modeled waveform for each of the plurality of modeled data buffers based on the signal values stored in the first portion and the second portion of each of the plurality of modeled data buffers, comparing each of the modeled waveforms to light data from the light receiver to identify a modeled data buffer in closest agreement with the light data, and determining that the possible signal value of the modeled data buffer in closest agreement with the light data is an actual signal value of the LCom signal.

In some embodiments, the first portion of the LCom signal is at least one of a predefined starting sequence or a first signal value captured by the light receiver following an extended idle period in the LCom signal. In some embodiments, the method further includes advancing each of the plurality of modeled data buffers by one LCom signal period, and updating the first portion of each of the plurality of modeled data buffers with the actual signal value of the LCom signal. In some embodiments, the method further includes applying an offset correction to data in the first portion of each of the plurality of modeled data buffers based on a difference between the light data and the modeled data buffer in closest agreement with the light data.

Additional embodiments of the present disclosure are directed to a computing device that includes a light receiver configured to receive light data encoded with a light-based communication (LCom) signal, in which the light receiver includes a rolling shutter light receiver having overlapping raster lines, and a processor coupled to the light receiver and configured to store a portion of the light data in a data buffer as the light data is received, in which the portion of the light data includes an exiting bit in the data buffer and an entering bit in the data buffer, determine a curvature of the data buffer, and determining a value of the entering bit in the portion of the light data based at least in part on the curvature.

In some embodiments, the processor is further configured to determine whether an exposure time duration of the overlapping raster lines is an integer multiple of a bit period of the LCom signal, and determine the value of the entering bit based on the curvature in response to determining that the exposure time duration of the overlapping raster lines is not an integer multiple of the bit period. In some embodiments, the processor is further configured to determine the value of the entering bit based on the curvature and the value of the exiting bit in response to determining that the exposure time duration of the overlapping raster lines is an integer multiple of the bit period. In some embodiments, a value of the exiting bit is determined from measuring a first bit value captured by the light receiver following an extended idle period in the LCom signal. In some embodiments, the processor is further configured to calculate a threshold value for determining whether the curvature is flat or changing, and compare the threshold value to the calculated curvature to determine the curvature. In some embodiments, the processor is further configured to determine whether the LCom signal is encoded with an average-to-idle encoding scheme. In some embodiments, the processor is further configured to determine the curvature of the data buffer by calculating a running average of a value of the exiting bit and a value of the entering bit, and determining whether the running average is flat, a positive peak, or a negative trough. In some embodiments, the processor is further configured to determine the curvature of the data buffer by calculating a threshold value for determining whether the curvature is flat or changing, and comparing the threshold value to the running average to determine the curvature.

Additional embodiments of the present disclosure are directed to a computing device that includes a light receiver configured to receive light data encoded with a light-based communication (LCom) signal, in which the light receiver includes a rolling shutter light receiver having overlapping raster lines, and a processor coupled to the light receiver and configured to configure a plurality of modeled data buffers, in which each of the plurality of modeled data buffers has a length based on an exposure time duration of the overlapping raster lines, initialize a first portion of each of the plurality of modeled data buffers with a first portion of the LCom signal, fill a second portion of each of the plurality of modeled data buffers with a possible signal value, in which each of the plurality of modeled data buffers has a different possible signal value in the second portion, calculate a modeled waveform for each of the plurality of modeled data buffers based on the signal values stored in the first portion and the second portion of each of the plurality of modeled data buffers, compare each of the modeled waveforms to light data from the light receiver to identify a modeled data buffer in closest agreement with the light data, and determine that the possible signal value of the modeled data buffer in closest agreement with the light data is an actual signal value of the LCom signal.

In some embodiments, the first portion of the LCom signal is at least one of a predefined starting sequence or a first signal value captured by the light receiver following an extended idle period in the LCom signal. In some embodiments, the processor is further configured to advance each of the plurality of modeled data buffers by one LCom signal period, and update the first portion of each of the plurality of modeled data buffers with the actual signal value of the LCom signal. In some embodiments, the processor is further configured to apply an offset correction to data in the first portion of each of the plurality of modeled data buffers based on a difference between the light data and the modeled data buffer in closest agreement with the light data

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, in which:

FIG. 2 is a block diagram illustrating an example LCom enabled luminaire;

DETAILED DESCRIPTION

Light-based communications ("LCom") systems can be used for digital communications for a variety of purposes, such as providing navigation and positioning information to a user. An LCom signal can be decoded with a light receiver, such as a still-image camera, video camera, and/or light sensor, of a computing device, such as a mobile computing device. Typical light receivers of a mobile computing device, however, sample signals at a slower rate than the transmission frequency of LCom signals. For example, a typical LCom signal frequency may be 2 kHz, whereas a typical camera on a mobile computing device such as a smartphone may have an effective sampling rate of only 600 Hz, which is inadequate for collecting sufficient data to accurately reconstruct an LCom signal.

Accurate signal reconstruction is conventionally thought to require sampling the transmitted signal at a rate of at least twice the signal frequency, or equivalently sampling at a period of at least half the wave period of the message signal. These equivalent sampling criteria are known as the "Nyquist rate" and "Nyquist period," respectively. In practice, it is often desirable to have a sampling rate that is three to five times the signal frequency. When these criteria are applied to LCom signals, which often have a transmission frequency of about 2 kHz, which is beyond the ability of a human eye to see variations in the light intensity or "flickering," a minimum sampling criterion of 4,000 samples per second or equivalently a sampling period of 0.25 milliseconds is required. Thus, in this example, the Nyquist rate is far higher than the sampling rates of typical light receivers of mobile computing devices. This presents a technical challenge when using a light receiver of a mobile communications device for receiving an LCom message signal and decoding the LCom signal accurately so that the message can be successfully provided to the user.

Figure 1A:
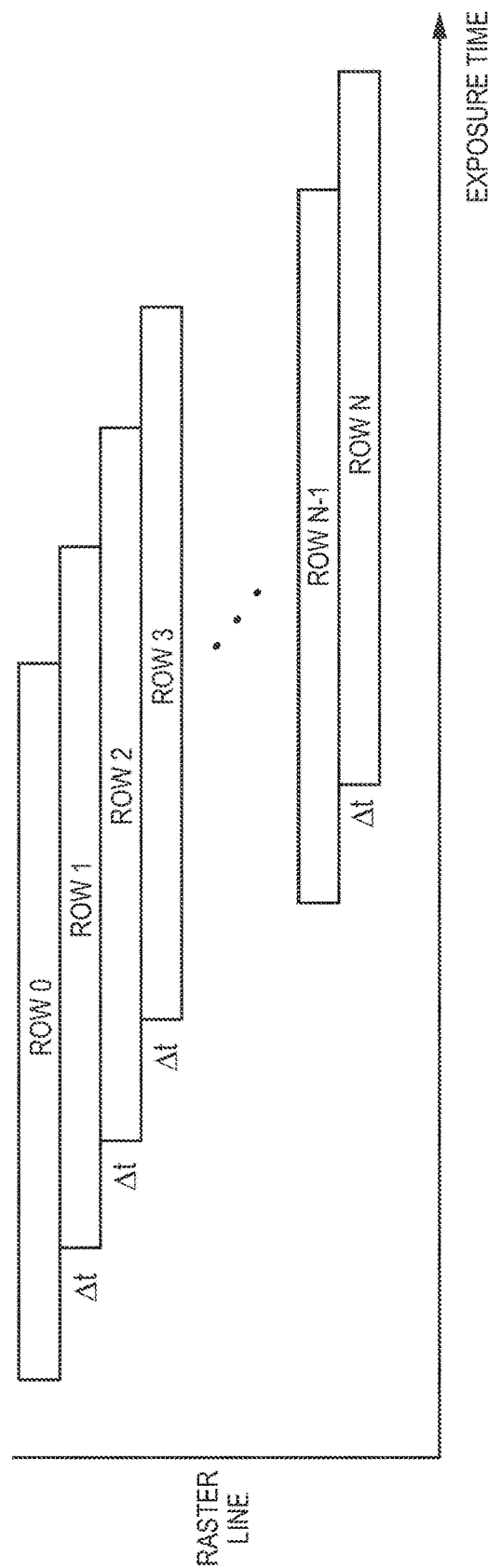
FIG. 1A schematically illustrates a prior art rolling shutter capture scheme.

This challenge is particularly notable when using a mobile communications device having a light receiver that utilizes rolling shutter image capture scheme. An example rolling shutter method is schematically illustrated in FIG. 1A. As shown, each row of sensor pixels (known as a "raster line") in a sensor of an image capture device (e.g., a camera of a mobile computing device) records light intensity data from a light source. The light intensity data recorded within each raster line corresponds to a same moment in time but different spatial locations of the light source. Most LCom decoding schemes average the light intensity values for each sensor pixel in a raster line to a single value. This single value is then used for creating a photograph or video, or for decoding an LCom signal.

One deficiency of the rolling shutter scheme is that it reduces the number of independent data points captured from an LCom enabled luminaire. FIG. 1A conceptually illustrates timing of exposure for N rows of raster lines of a light receiver, such as a complementary metal-oxide-semiconductor (CMOS) sensor, in an example rolling shutter scheme, with the vertical axis representing raster line position and the horizontal axis representing exposure time. As shown in FIG. 1A, each raster line of the light receiver begins its image capture after a small time delay, $\Delta t$, relative to the preceding adjacent raster line. As shown in FIG. 1A, $\Delta t$ is typically less than a length of raster line exposure time for a raster line to complete its image data capture, such that many of the raster lines capture at least some of the light intensity data from the LCom enabled luminaire at the same time. As a result, each of these "overlapping" raster lines includes at least some of the same light intensity data. This has the effect of reducing the sampling rate of rolling shutter image capture devices. For example, if 50 raster lines overlap at any given time, the number of unique samples of light intensity data captured during a frame is the number of total raster lines in the frame divided by 50. For example, if a mobile computing device light receiver has 1000 raster lines per frame, but 50 raster lines overlap at any one time, the light receiver only captures 20 unique samples per frame because 50 raster lines overlap and therefore include some of the same light intensity data.

Reducing the number of samples by using a rolling shutter scheme is problematic for at least the reason that it reduces the number of samples captured by an image capture device, resulting in an effective sampling rate that is typically well below a Nyquist rate associated with a given LCom signal needed for accurate signal decoding. To overcome this technical challenge, embodiments of the present disclosure include methods and systems for sampling an LCom signal at a rate less than the Nyquist rate with a light receiver of a computing device and accurately decoding the signal.

FIGS. 1B to 3 illustrate an example system for LCom communications that may employ aspects of the present disclosure. In some examples, LCom includes communication between an LCom enabled solid-state luminaire and a receiving device, such as a mobile computing device having a digital camera or other sensor capable of detecting LCom signals. An LCom enabled luminaire can emit a signal using pulsing light encoded with data according to a communication protocol.

In general, the light utilized in LCom may be of any spectral band, visible or otherwise, and may be of any intensity, as desired for a given target application or end-use. In accordance with some embodiments, in an LCom system, a given LCom enabled luminaire may be configured to transmit a pulsing light signal encoded with data (an LCom signal), and a given receiving device, such as a mobile computing device, may be configured to detect the pulsing light signal encoded with data via one or more light receivers, such as a still-image camera, video camera, and/or ambient light sensor. Many digital camera devices available in mobile computing devices are capable of operating as both still and video cameras.

As will be appreciated in light of this disclosure, techniques disclosed herein can be utilized in any of a wide range of LCom applications and contexts. For example, techniques disclosed herein can be utilized, in accordance with some embodiments, in transmitting location and positioning information between an LCom enabled luminaire and a light receiver. This information may be utilized, in part or in whole, to provide for indoor navigation, in accordance with some embodiments. In some cases, techniques disclosed herein can be utilized as the basis for a positioning and navigation system that may realize improvements in positioning precision and accuracy, for example, over existing Global Positioning System (GPS)-based and Wi-Fi positioning system (WPS)-based systems. As such, it follows that techniques disclosed herein can be utilized, in accordance with some embodiments, for commercial endeavors not possible with existing GPS-based and Wi-Fi-based approaches. For example, while the limited accuracy of existing GPS-based and Wi-Fi-based approaches may not be sufficient for directing a customer to an item of interest on a shelf within a retail store, techniques disclosed herein can be utilized, in accordance with some embodiments, to lead customers directly to in-store promotions and other on-shelf items, as desired. Numerous configurations and variations will be apparent in light of this disclosure.

Figure 1B:
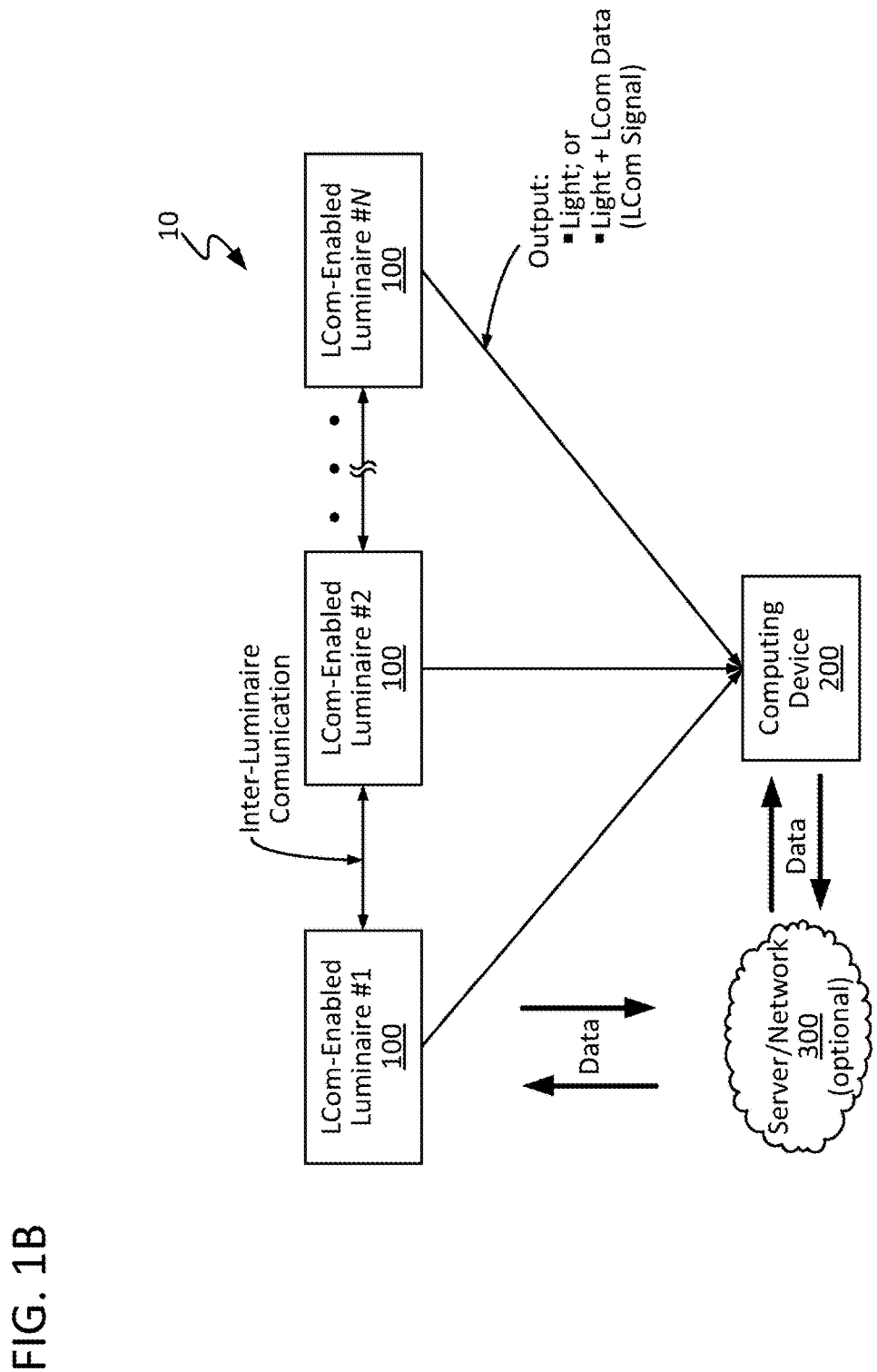
FIG. 1B is a block diagram illustrating an example light-based communication (LCom) network.

FIG. 1B illustrates an example light-based communication (LCom) system 10 configured in accordance with an embodiment of the present disclosure. As can be seen, system 10 may include one or more LCom enabled luminaires 100 configured for light-based communication with a receiving computing device 200 via LCom signal(s). LCom signals may be provided via visible light-based signals or non-visible light-based signals. In some cases, LCom may be provided in only one direction; for instance, LCom data may be passed from a given LCom enabled luminaire 100 (e.g., the transmitter) to a computing device 200 (e.g., the receiver), or from a computing device 200 (e.g., the transmitter) to a given LCom enabled luminaire 100 (e.g., the receiver). In some other cases, LCom may be provided in both or multiple directions. For example, LCom data may be passed between a given LCom enabled luminaire 100 and a computing device 200, where both act in a transmitting and receiving (e.g., transceiver) capacity. In some cases in which system 10 includes a plurality of LCom enabled luminaires 100, all (or some sub-set) thereof may be configured for communication with one another (e.g., inter-luminaire communication). In accordance with some embodiments, system 10 optionally may include or otherwise be configured for communication, for example, with a server/network 300 (discussed below). Communication may be provided, for example, between server/network 300 and computing device 200 and/or one or more LCom enabled luminaires 100, as desired.

FIG. 2 illustrates an LCom enabled luminaire 100a configured in accordance with an embodiment of the present disclosure. As can be seen, a given LCom enabled luminaire 100 may include one or more solid-state light sources 110, in accordance with some embodiments. The quantity, density, and arrangement of solid-state light sources 110 utilized in a given LCom enabled luminaire 100 may be customized, as desired for a given target application or end-use. A given solid-state light source 110 may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. A given solid-state emitter may be configured to emit electromagnetic radiation (e.g., light), for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness semiconductor light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate, as will be apparent in light of this disclosure. In some cases, power and/or control connections for a given solid-state emitter may be routed from a given PCB to a driver 120 (discussed below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials known in the art. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include one or more optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted therethrough. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom enabled luminaire 100 may be electronically coupled with a driver 120. In some cases, driver 120 may be an electronic driver (e.g., single-channel; multi-channel) configured, for example, for use in controlling the one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques known in the art, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As shown in FIG. 2, example LCom enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom enabled luminaire 100 and one or more of the modules thereof (e.g., within memory 130 or elsewhere). In some cases, memory 130 may be configured to be utilized, for example, for processor workspace (e.g., for one or more processors 140) and/or to store media, programs, applications, and/or content on a host LCom enabled luminaire 100 on a temporary or permanent basis.

One or more applications 132 stored in memory 130 can be accessed and executed, for example, by the one or more processors 140 of a given LCom enabled luminaire 100. In accordance with some embodiments, a given application of memory 130 can be implemented in any suitable standard and/or custom/proprietary programming language, such as, for example: (1) C; (2) C++; (3) objective C; (4) JavaScript;

and/or (5) any other suitable custom or proprietary instruction sets. The applications of memory 130 can be encoded, for example, on a machine-readable medium that, when executed by a processor 140, carries out the functionality of a given LCom enabled luminaire 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the applications 132 may be implemented in hardware, software, and/or firmware, as desired for a given target application or end-use.

In accordance with some embodiments, memory 130 may have stored therein (or otherwise have access to) one or more applications 132. In some instances, a given LCom enabled luminaire 100 may be configured to receive input, for example, via one or more applications 132 stored in memory 130 (e.g., such as a lighting pattern, LCom data, etc.). Other suitable modules, applications, and data which may be stored in memory 130 (or may be otherwise accessible to a given LCom enabled luminaire 100) will depend on a given application.

In accordance with some embodiments, the one or more solid-state light sources 110 of a given LCom enabled luminaire 100 can be electronically controlled, for example, to output light and/or light encoded with LCom data (e.g., an LCom signal). To that end, a given LCom enabled luminaire 100 may include or otherwise be communicatively coupled with one or more controllers 150, in accordance with some embodiments. In some embodiments, a controller 150 may be hosted by a given LCom enabled luminaire 100 and operatively coupled (e.g., via a communication bus/interconnect) with the one or more solid-state light sources 110 (1-N) of that LCom enabled luminaire 100. In other examples, a controller 150 may be hosted in whole or in part by individual solid state light sources 110. Controller 150 may output a digital control signal to any one or more of the solid-state light sources 110 and may do so, for example, based on wired and/or wireless input received from a given local source (e.g., such as memory 130) and/or remote source (e.g., such as a control interface, optional server/network 300 (FIG. 1B), etc.). As a result, a given LCom enabled luminaire 100 may be controlled in such a manner as to output any number of output beams (1-N), which may include light and/or LCom data (e.g., an LCom signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing, tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom enabled luminaire 100. In some embodiments, controller 150 may be configured to output a control signal to modulator 174 (discussed below) to facilitate modulation of an LCom signal for transmission by a given LCom enabled luminaire 100. Other suitable configurations and control signal output for a given controller 150 of a given LCom enabled luminaire 100 will depend on a given application and will be apparent in light of this disclosure.

In accordance with some embodiments, a given LCom enabled luminaire 100 may include an encoder 172. In some embodiments, encoder 172 may be configured, for example, to encode LCom data in preparation for transmission thereof by the host LCom enabled luminaire 100. To that end, encoder 172 may be provided with any suitable configuration, as will be apparent in light of this disclosure. In accordance with some embodiments, a given LCom enabled luminaire 100 may include a modulator 174. In some embodiments, modulator 174 may be configured, for example, to modulate an LCom signal in preparation for transmission thereof by the host LCom enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). Modulator 174 may utilize any of a wide range of driving techniques known in the art, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom enabled luminaire 100 may include a multiplier 176. Multiplier 176 may be configured to combine an input received from an upstream modulator 174 with an input received from an ambient light sensor 165 (discussed below). In some instances, multiplier 176 may be configured to increase and/or decrease the amplitude of a signal passing therethrough, as desired. Other suitable configurations for multiplier 176 will depend on a given application and will be apparent in light of this disclosure.

In accordance with some embodiments, a given LCom enabled luminaire 100 may include an adder 178. Adder 178 may be configured to combine an input received from an upstream multiplier 176 with a DC level input. In some instances, adder 178 may be configured to increase and/or decrease the amplitude of a signal passing therethrough, as desired. Other suitable configurations for adder 178 will depend on a given application and will be apparent in light of this disclosure.

In accordance with some embodiments, a given LCom enabled luminaire 100 may include a digital-to-analog converter (DAC) 180. DAC 180 may be configured to convert a digital control signal into an analog control signal to be applied to a given solid-state light source 110 of the host LCom enabled luminaire 100 to output an LCom signal therefrom. Other suitable configurations for DAC 180 will depend on a given application and will be apparent in light of this disclosure.

In accordance with some embodiments, a given LCom enabled luminaire 100 may include one or more sensors 160. In some embodiments, a given LCom enabled luminaire 100 optionally may include an altimeter 161. When included, altimeter 161 may be configured to aid in determining the altitude of a host LCom enabled luminaire 100 with respect to a given fixed level (e.g., a floor, a wall, the ground, or other surface). In some embodiments, a given LCom enabled luminaire 100 optionally may include a geomagnetic sensor 163. When included, geomagnetic sensor 163 may be configured to determine the orientation and/or movement of a host LCom enabled luminaire 100 relative to a geomagnetic pole (e.g., geomagnetic north) or other desired heading, which may be customized as desired for a given target application or end-use. In some embodiments, a given LCom enabled luminaire 100 optionally may include an ambient light sensor 165. When included, ambient light sensor 165 may be configured to detect and measure ambient light levels in the surrounding environment of the host LCom enabled luminaire 100. In some cases, ambient light sensor 165 may be configured to output a signal, for example, to a multiplier 176 of LCom enabled luminaire 100. In some embodiments, a given LCom enabled luminaire 100 optionally may include a gyroscopic sensor 167. When included, gyroscopic sensor 167 may be configured to determine the orientation (e.g., roll, pitch, and/or yaw) of the host LCom enabled luminaire 100. In some embodiments, a given LCom enabled luminaire 100 optionally may include an accelerometer 169. When included, accelerometer 169 may be configured to detect motion of the host LCom enabled luminaire 100. In any case, a given sensor 160 of a given host LCom enabled luminaire 100 may include mechanical and/or solid-state componentry, as desired for a given target application or end-use. The present disclosure is not so limited only to these example optional sensors 160, as additional and/or different sensors 160 may be provided, as desired for a given target application or end-use, in accordance with some other embodiments. Numerous configurations will be apparent in light of this disclosure.

In accordance with some embodiments, a given LCom enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom enabled luminaires 100. To that end, communication module 170 may be configured to use any suitable wired and/or wireless transmission technologies (e.g., radio frequency, or RF, transmission; infrared, or IR, light modulation; etc.), as desired for a given target application or end-use. Other suitable configurations for communication module 170 will depend on a given application and will be apparent in light of this disclosure.

Figure 3:
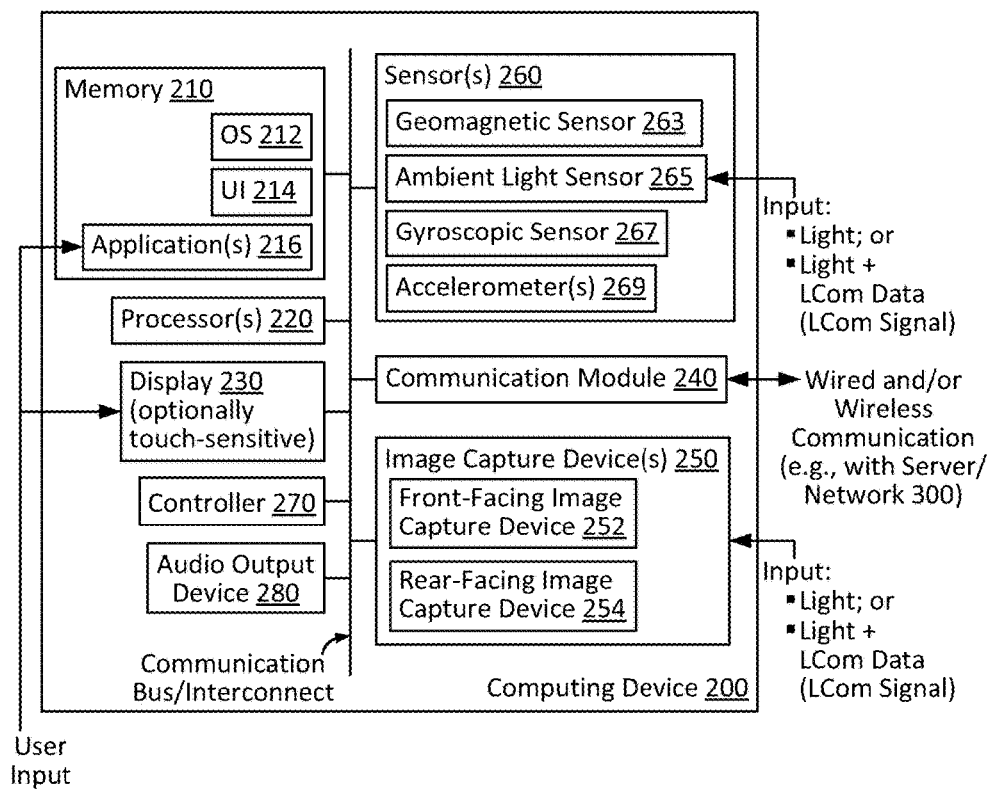
FIG. 3 illustrates an example computing device.

FIG. 3 illustrates an example computing device 200 configured in accordance with an embodiment of the present disclosure. As discussed herein, computing device 200 may be configured, in accordance with some embodiments: (1) to detect light pulses encoding an LCom signal emitted by a transmitting LCom enabled luminaire 100; and (2) to decode data in the LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be seen from FIG. 3, computing device 200 may include memory 210 and one or more processors 220. Memory 210 can be any suitable type (e.g., RAM and/or ROM, or other suitable memory) and size, and in some cases may be implemented with volatile memory, non-volatile memory, or a combination thereof. A given processor 220 of computing device 200 may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis.

The one or more modules stored in memory 210 can be accessed and executed, for example, by the one or more processors 220 of computing device 200. In accordance with some embodiments, a given module of memory 210 can be implemented in any suitable standard and/or custom/proprietary programming language, such as, for example: (1) C; (2) C++; (3) objective C; (4) JavaScript; and/or (5) any other suitable custom or proprietary instruction sets. The modules of memory 210 can be encoded, for example, on a machine-readable medium that, when executed by a processor 220, carries out the functionality of computing device 200, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 210 (e.g., such as operating system (OS) 212, user interface (UI) 214, and/or one or more applications 216, each discussed below) can be implemented in hardware, software, and/or firmware, as desired for a given target application or end-use.

OS 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure.

Figure 4:
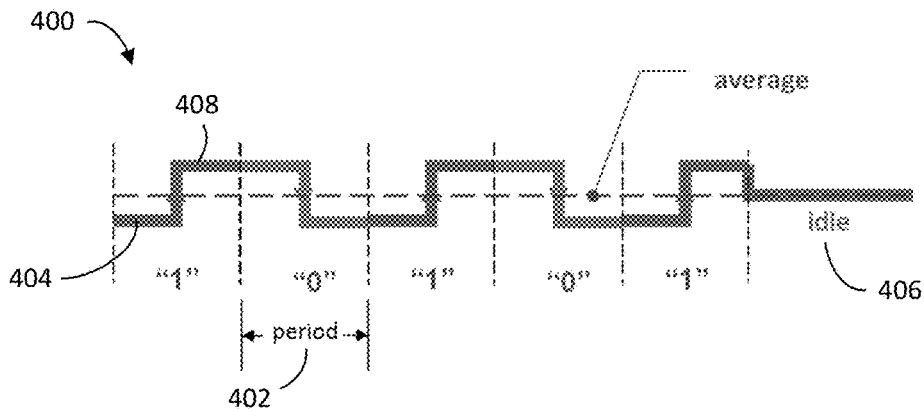
FIG. 4 illustrates an example LCom signal that can be decoded using aspects of the present disclosure.

In some cases, UI 214 can be implemented in memory 210 (e.g., as generally shown in FIG. 4), whereas in some other cases, UI 214 can be implemented in a combination of locations (e.g., at memory 210 and at display 230, discussed below), thereby providing UI 214 with a given degree of functional distributedness. UI 214 may be configured, in accordance with some embodiments, to present a graphical UI (GUI) at display 230 that is configured, for example, to aid in carrying out any of the various LCom-related techniques discussed herein. Other suitable configurations and capabilities for UI 214 will depend on a given application.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). Other suitable modules, applications, and data which may be stored in memory 210 (or may be otherwise accessible to computing device 200) will depend on a given application and will be apparent in light of this disclosure.

As can be seen further from FIG. 3, computing device 200 may include a display 230, in accordance with some embodiments. Display 230 can be any electronic visual display or other device configured to display or otherwise generate an image (e.g., image, video, text, and/or other displayable content). In some instances, display 230 may be integrated, in part or in whole, with computing device 200, whereas in some other instances, display 230 may be a stand-alone component configured to communicate with computing device 200 using any suitable wired and/or wireless communications means.

In some cases, display 230 optionally may be a touch-screen display or other touch-sensitive display. Display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In some embodiments, display 230 may generally be configured to detect or otherwise sense direct and/or proximate contact from a user's finger, stylus, or other suitable implement at a given location of that display 230. In some cases, display 230 may be configured to translate such contact into an electronic signal that can be processed by computing device 200 (e.g., by the one or more processors 220 thereof) and manipulated or otherwise used to trigger a given GUI action. In some cases, a touch-sensitive display 230 may facilitate user interaction with computing device 200 via the GUI presented by such display 230. Numerous suitable configurations for display 230 will be apparent in light of this disclosure.

In accordance with some embodiments, computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom enabled luminaires 100. In some cases, communication module 240 of computing device 200 and communication module 170 of a given LCom enabled luminaire 100 (FIG. 2) may be configured to utilize the same communication protocol. In some cases, communication module 240 may be configured to communicate with a server/network 300 (discussed below). Other suitable configurations for communication module 240 will depend on a given application.

Also, as can be seen from FIG. 3, computing device 200 may include one or more image capture devices 250 (also referred to herein as light receivers), such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced.

A given image capture device 250 can be any device configured to capture digital images, such as a still camera (e.g., a camera configured to capture still photographs) or a video camera (e.g., a camera configured to capture moving images including a plurality of frames). In some cases, a given image capture device 250 may include components such as, for instance, an optics assembly, an image sensor, and/or an image/video encoder, and may be integrated, in part or in whole, with computing device 200. These components (and others, if any) of a given image capture device 250 may be implemented in any combination of hardware, software, and/or firmware, as desired for a given target application or end-use. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom enabled luminaire 100 (FIGS. 1B, 2). In some instances, a given image capture device 250 may be, for example, a camera like one typically found in mobile computing devices. Other suitable configurations for a given image capture device 250 (e.g., front-facing image capture device 252; rear-facing image capture device 254) of computing device 200 can depend on a given application.

In accordance with some embodiments, computing device 200 may include one or more sensors 260. In some embodiments, computing device 200 optionally may include a geomagnetic sensor 263. When included, geomagnetic sensor 263 may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured to detect and measure ambient light levels in the surrounding environment of the host computing device 200. In some embodiments, computing device 200 optionally may include a gyroscopic sensor 267. When included, gyroscopic sensor 267 may be configured to determine an orientation (e.g., roll, pitch, and/or yaw) of computing device 200. And in some embodiments, computing device 200 optionally may include an accelerometer 269. When included, accelerometer 269 may be configured to detect a motion of the computing device 200. Computing device 200 may generally include sensors 260 that include mechanical and/or solid-state componentry, as desired for a given target application or end-use. In other examples additional and/or different sensors 260 may be provided, as desired for a given target application or end-use, in accordance with some other embodiments.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as memory 210) and/or remote source (e.g., such as a control interface, optional server/network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250 (e.g., front-facing image capture device 252 and/or rear-facing image capture device 254). In some instances, a given controller 270 may be configured to output a control signal to control operation of one or more sensors 260. Other suitable configurations and control signal output for a given controller 270 of computing device 200 will depend on a given application and will be apparent in light of this disclosure.

As shown in FIG. 3, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Other suitable types and configurations for audio output device 280 will depend on a given application and will be apparent in light of this disclosure.

Server/network 300 (FIG. 1B) can be any suitable public and/or private communications network. For instance, in some cases, server/network 300 may be a private local area network (LAN) operatively coupled to a wide area network (WAN), such as the Internet. In some cases, server/network 300 may include one or more second-generation (2G), third-generation (3G), and/or fourth-generation (4G) mobile communication technologies. In some cases, server/network 300 may include a wireless local area network (WLAN) (e.g., Wi-Fi wireless data communication technologies). In some instances, server/network 300 may include Bluetooth wireless data communication technologies. In some cases, server/network 300 may include supporting infrastructure and/or functionalities, such as a server and a service provider, but such features are not necessary to carry out communication via server/network 300. In some instances, computing device 200 may be configured for communication with, for example, with a server/network 300 and one or more LCom enabled luminaires 100. In some cases, computing device 200 may be configured to receive data from server/network 300, for example, which serves to supplement LCom data received by computing device 200 from a given LCom enabled luminaire 100. In some instances, computing device 200 may be configured to receive data (e.g., such as position, ID, and/or other data pertaining to a given LCom enabled luminaire 100) from server/network 300 that facilitates indoor navigation via one or more LCom enabled luminaires 100. In some cases, server/network 300 may include or otherwise have access to one or more lookup tables of data that may be accessed by a computing device 200 communicatively coupled therewith. Numerous configurations for server/network 300 will be apparent in light of this disclosure.

Decoding an LCom Signal

Figure 8:
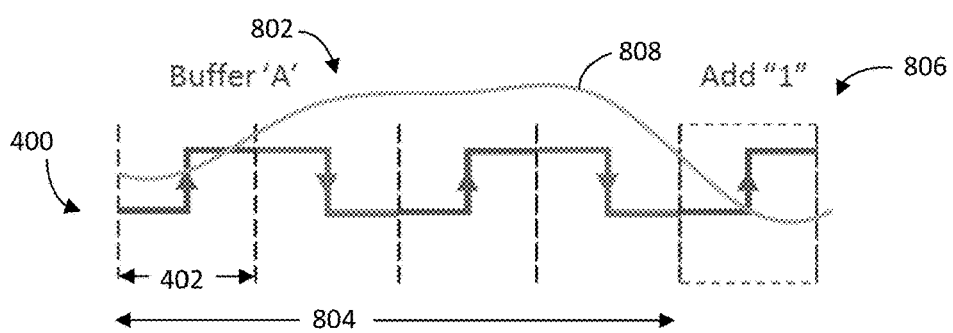
FIG. 8 illustrates a modeled data buffer for implementing a signal reconstruction method of the present disclosure.
Figure 9:
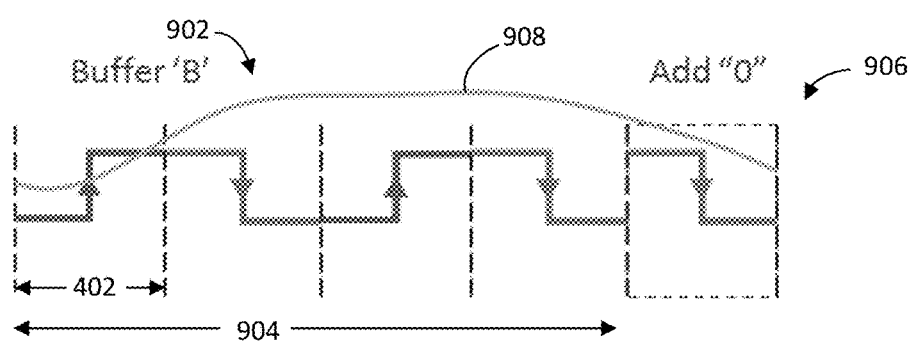
FIG. 9 illustrates another modeled data buffer for implementing a signal reconstruction method of the present disclosure.
Figure 10:
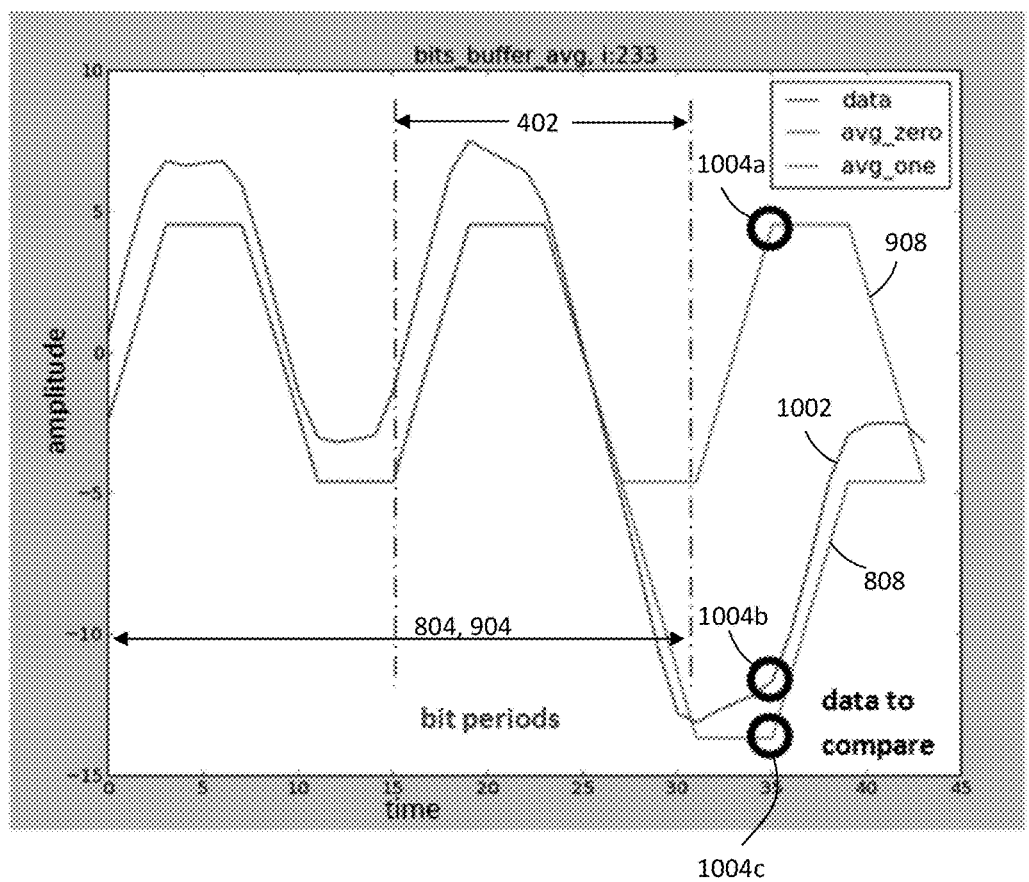
FIG. 10 is a plot of amplitude versus time of a running average calculation of the modeled data buffers of FIGS. 8 and 9 and actual data acquired by a light receiver.

As presented above, the sampling rates of image capture devices of conventional mobile computing devices generally are not fast enough to meet the Nyquist sampling frequency required for accurate reconstruction of an LCom signal. In light of this, embodiments of the present disclosure apply analytical techniques based on characteristics a given light receiver to infer or reconstruct a received LCom signal despite a low effective sampling rate. FIGS. 4 to 7 illustrate one embodiment, in which an LCom signal can be decoded by monitoring a curvature of an output of a running average calculation of raster line values. FIGS. 8 to 10 show another embodiment, in which an LCom signal can be decoded with one or more signal reconstruction methods disclosed herein.

Curvature Method

FIG. 4 illustrates an example LCom signal 400 which is presented by way of example to illustrate various LCom decoding techniques of the present disclosure. LCom signal 400 is encoded with a Manchester encoding scheme, which is known in the art and a common scheme for LCom. LCom signal 400 encodes two different kinds of bits, namely one or zero, with each bit encoded in one period 402 of the LCom signal, and each bit consisting of two symbols, namely low symbol 404, having an amplitude below an idle value 406, and a high symbol 408, having an amplitude above the idle value 406. As shown in FIG. 4, according to the Manchester scheme, a "1" is encoded by a high symbol 408 preceded by a low symbol 404 and a "0" is encoded by a low symbol 404 preceded by a high symbol 408.

Manchester-encoded signals, such as LCom signal 400, have the characteristic of averaging to idle 406 such that a running average window of any length that is an even multiple of the bit period 402 have an average equal to idle. Other examples of encoding schemes that have the same average-to-idle characteristic include other on-off keying modulation schemes such as Ternary Manchester, NRZ (Non-Return to Zero), RZ (Return to Zero), hybrid ternary encoding, and alternative mark inversion. In some examples, an encoding scheme may be modified to adhere to additional rules so that the scheme has the desired average-to-idle characteristic. In some examples, encoding schemes other than on-off keying encoding schemes that have the average-to-idle characteristic may be used. This characteristic of average-to-idle encoding schemes can be leveraged to accurately decode an LCom signal, such as LCom signal 400, with a computing device having a light receiver with rolling shutter camera, such as computing device 200 (FIG. 2), even when the rolling shutter camera characteristic results in an effective sampling rate that falls below the Nyquist rate.

Figure 5:
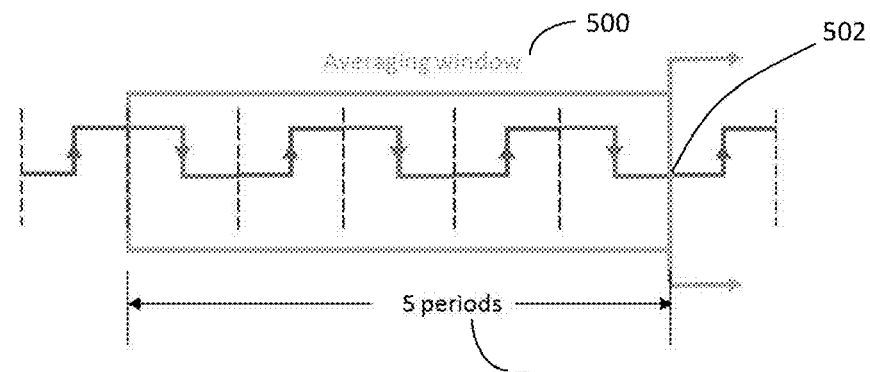
FIG. 5 illustrates an example running average window for implementing a curvature method of the present disclosure for a running average window that is an integer-multiple of an LCom signal bit period.

As discussed above, a rolling shutter light receiver employs a light capturing scheme in which the exposure time of N adjacent raster lines overlaps in time. This can be modeled as an effective running average window having a time duration "$t_{AVG}$" that extends from the beginning of light exposure for a first raster line to an end of light exposure of the Nth raster line. FIG. 5 illustrates an example running average window 500 that averages the values of bit values within the window, in which the period 402 of LCom signal 400 is an even multiple of $t_{AVG}$ for a given light receiver and, in the illustrated example, extends over five periods 402. For example, running average window 500 is an integer multiple of the LCom signal bit period 402. In one example, LCom signal 400 can be decoded by determining each bit that enters running average window 500. As shown in FIG. 5 and as discussed above, LCom signal 400 averages to idle such that when a beginning 502 of running average window 500 is aligned with a beginning of a period, the portion of the signal within the window are complete bits that average to idle such that only the bits entering and exiting the window will cause the average to diverge from idle.

Figure 6:
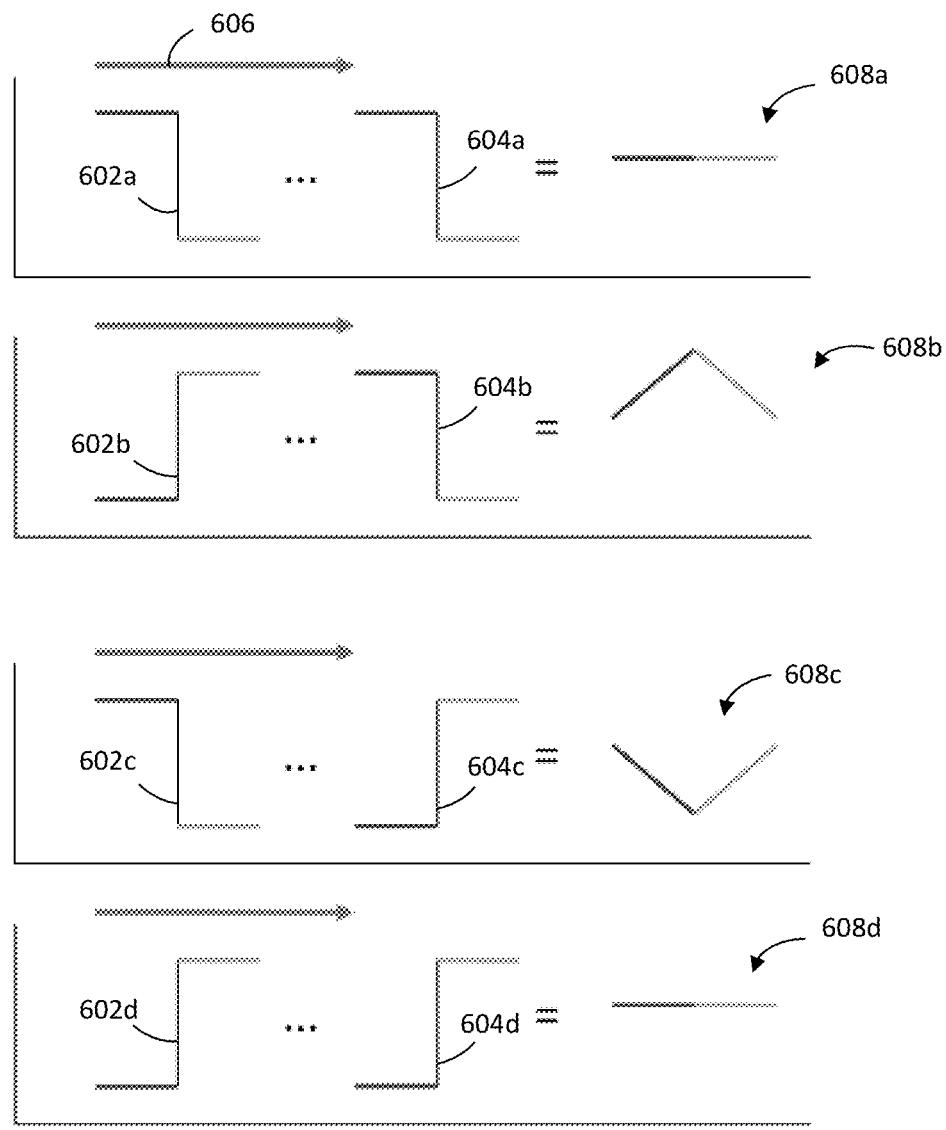
FIG. 6 is a modified version of the running average window of FIG. 5 showing entering and exiting bits and a running average curvature calculation.

FIG. 6 is a modified version of FIG. 5 in which the bits within running average window 500 are omitted and only the exiting bits 602a-602d and entering bits 604a-604d that are exiting from, and entering into, running average window 500 are illustrated. Arrow 606 represents the progression of the running average window 500 through LCom signal 400. FIG. 6 also illustrates an output 608 of the running average calculation as bits 602 exit and 604 enter, with 608a and d being flat because the exiting and entering bits have the same value resulting in no change to the running average of bit values within window 500 at any one time, 608b being a positive peak because the exiting bit is one and the entering bit is zero resulting in an increase and then decrease in the average value, and 608c being a being a negative trough because the exiting bit is zero and the entering bit is one resulting in a decrease and then increase in the average value. As is apparent from FIG. 6, and as summarized in Table 1 below, in this example, the value of a bit entering running average window 500 (e.g., entering bits 604a-d) can be determined from the change in the value of the running average calculation and from knowing the value of the bit exiting the running average window. Thus, LCom signal can be decoded by determining the values of the entering bits if the values of the exiting bits (e.g., 602a-d) are known.

TABLE 1

Effect of bits entering and exiting running average window (even multiple)

| Exiting bit | Entering bit | Average output |
|---|---|---|
| Zero | Zero | Flat |
| One | Zero | Positive peak |
| Zero | One | Negative trough |
| One | One | flat |

In one example, the value of an exiting bit from running average window 500 can be determined from a known start sequence of an LCom signal. For example, a mobile computing device may already have information that includes a predetermined start sequence. The beginning of an LCom signal following a long idle period of no modulation can be identified. The first bits entering running average window 500 following the long idle period would, therefore, be the known start sequence, which can be used to seed the model, and would be the first exiting bits. The first bit to enter the running average window following the known start sequence could then be determined based on the curvature of the running average calculation and the known exiting bit. In another example, the exiting bit can be determined by monitoring the running average output of running average window 500 following an idle period. Assuming a long idle time prior to the beginning of an LCom signal, the first bit can be determined from the measured output of a light receiver because the running average window will be filled with idle values such that the first entering bit can be determined despite the averaging effect because the average calculation will be equal to the first bit value because it will be averaged with idle values.

As illustrated in FIG. 6 and Table 1, above, in one example, LCom signal 400 may be decoded by: (1) monitoring a curvature of an output of a moving average window; (2) determining if the curvature is flat, a positive peak, or a negative trough; (3) determining a value of an exiting bit (e.g., exiting bits 602a-602d); (4) using the curvature and exiting bit to determine a value of an entering bit (e.g., entering bits 604a-604d); and (5) saving the determined entering bit in, e.g., memory, such as memory 210 of computing device 200 (FIG. 3). This process can be repeated for every bit in an LCom signal such as LCom signal 400, until the signal is decoded. In one example, because only the entering and exiting bits contribute to the running average, a curvature of the running average window can be determined from a curvature of the entering bit. In such an example, one bit period of data is collected corresponding to the entering bit and a curvature is calculated. A curvature can be determined in a number of ways, such as by performing a derivative calculation, or by convolving the measured data with one or more curves.

Figure 7:
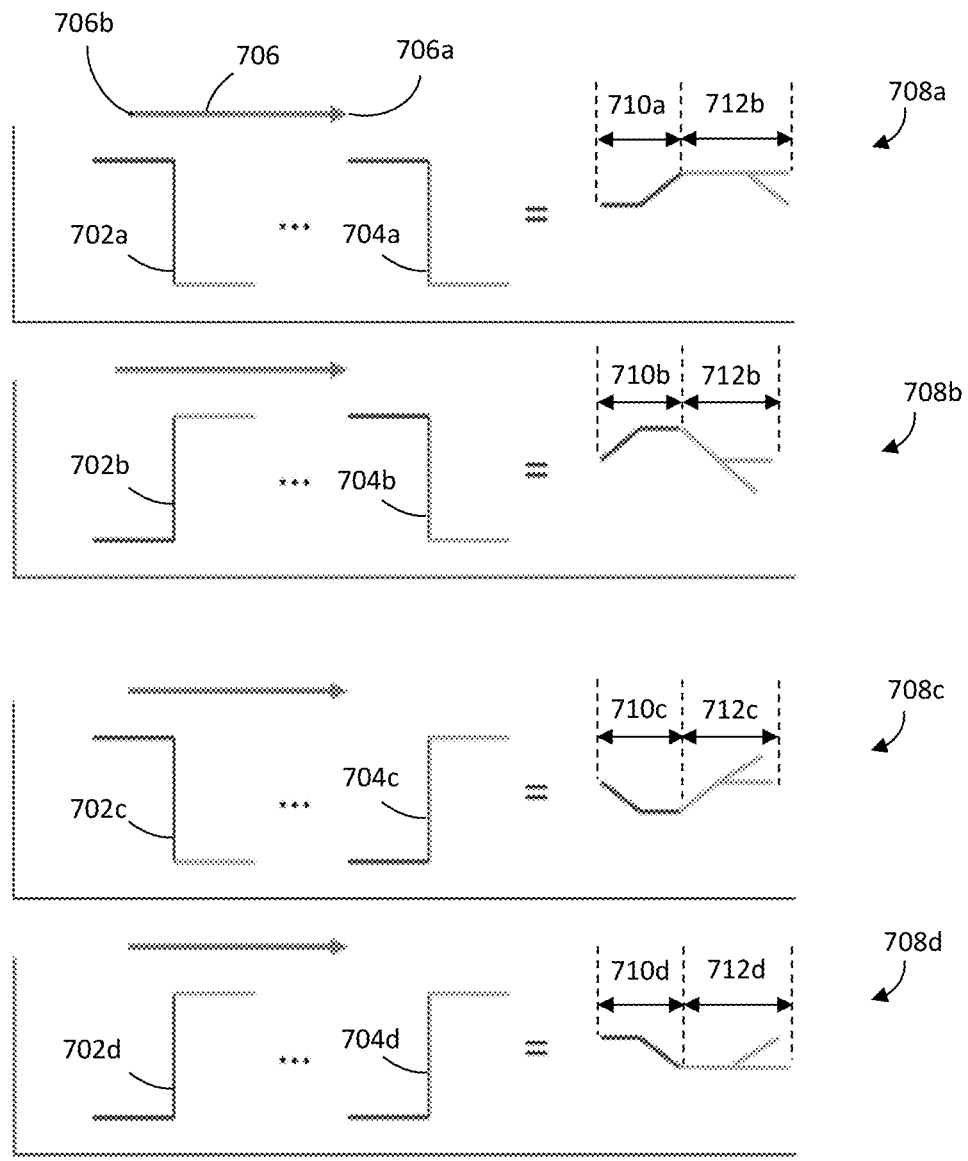
FIG. 7 illustrates example entering and exiting bits and a running average curvature calculation for an running average window that is a non-integer multiple of a bit period.

As discussed above, FIGS. 5 and 6 illustrate a scenario in which the characteristics of the light receiver being used to decode LCom signal 400 results in the running average window being an integer multiple of the bit period. In another example, the characteristics of the light receiver may result in a rolling shutter that collects light data with an effective running average window that is a non-integer multiple of the bit period, meaning the running average window time duration cannot be evenly divided by the bit period. In the example illustrated in FIG. 7, the running average window is a factor of n+½ of the bit period, meaning the running average window is offset by one half the bit period. FIG. 7 is similar to FIG. 6, illustrating only the bits exiting (bits 702a-d) and bits entering (bits 704a-d) from a running average window having a duration that is not an integer multiple of the bit period of a LCom signal being decoded. Arrow 706 represents the progression of the running average window through the LCom signal, with first end 706a representing the beginning of the window and second end 706b representing the end of the window. FIG. 7 also shows an output 708a-d of the running average calculation as bits 702 exit and 704 enter.

Outputs 708a-d include a first portion 710a-d that corresponds to the average calculation as the window progresses through a complete entering bit 704a-d and a second portion 712a-d which corresponds to the average calculation as the window progresses into the next entering bit. As shown in FIG. 7, when first end 706a of the running average window aligned with the beginning of the next entering bit 704, second end 706b of the window is in the middle of an exiting bit 702. With the running average window being offset by one half the bit period, the window progresses through part of the next exiting bit 702 as a new bit enters, which causes second portion 712 of output 708 to take on one of two different forms which is shown by a branching tail, depending on the value of the next exiting bit 702.

Table 2, below, summarizes the curvature values of first portions 710a-d for each of outputs 708a-d and illustrates that in the case of a non-even multiple running average window, the curvature of first portions 710 for a given entering bit is independent of the corresponding exiting bits. For example, an entering bit of zero has a positive curvature output over the first portion 710 of the average calculation and an entering bit of one has a negative curvature output over the first portion 710 of the average calculation, indicating the value of the exiting bit does not need to be determined to determine the value of the entering bit, as was the case for an running average window that is an even multiple of the bit period (Table 1).

TABLE 2

Effect of bits entering and exiting running average window (non-even multiple)

| Exiting bit | Entering bit | Average output |
|---|---|---|
| Zero | Zero | Positive curvature |
| One | Zero | Positive curvature |
| Zero | One | Negative curvature |
| One | One | Negative curvature |

Thus, in one example, an LCom signal may be decoded with a running average window that is a non-even multiple of the bit period of the signal being decoded by: (1) monitoring a curvature of an output of the window; (2) determining if a first portion of the curvature corresponding to a complete entering bit period is positive or negative; (3) determining a value of the entering bit (e.g., entering bits 704a-704d) based on the curvature; and (4) saving the determined entering bit in, e.g., memory, such as memory 210 of computing device 200 (FIG. 3). This process can be repeated for every bit in an LCom signal until the signal is decoded. In one example, because only the entering bits contribute to the running average, a curvature of the running average window can be determined from a curvature of the entering bit. In such an example, one bit period of data is collected corresponding to the entering bit and a curvature is calculated. A curvature can be determined in a number of ways, such as by performing a derivative calculation, or by convolving the measured data with one or more curves.

By knowing the bit period and running average window length, a decoding algorithm implementing the curvature method disclosed herein can determine whether to apply an even multiple (e.g. FIG. 6, Table 1) or non-even multiple (e.g. FIG. 7, Table 2) approach, based on whether the running average window is a multiple of the bit period. If an application implementing the algorithms disclosed herein determines the running average window is an even multiple, or nearly an even multiple within a threshold value, of the bit period, the application may either modify one or more light receiver settings, such as shutter speed, frame rate, etc., to modify raster line overlap, or can implement the even-multiple decoding process disclosed above.

If the LCom signal bit period is not known, then an idle region between bit streams can be used for detecting when the measured output has changed, e.g., when the signal exceeds some threshold, thereby signifying the beginning of a bit stream. The measurement between the first two peaks can be used to determine the bit period. In one example, once the running average window spans more than two bits, the rolling shutter averaging filter impacts the measured data such that the first two bits at the beginning of a bit stream may be used to accurately measure the bit period. In one example, peak detection to determine bit period may include convolving a start period portion of the signal with predicted bit periods. For example, a peak detection algorithm may convolve a start bit region of signal data with predicted bit periods of, e.g., 1 ms, 1.1 ms, 1.2 ms, 1.3 ms, etc, to determine which predicted bit period correlates best with the data. By interpolating between the two highest matching scores, the time period of a peak can be calculated.

In the course of decoding an LCom signal by monitoring a curvature of a running average calculation, the light receiver may differentiate between detected light modulation associated with an LCom signal and changes in modulation due signal noise and low frequency disturbances. In one example, a threshold may be applied to the running average value, in which changes above the threshold are considered a positive or negative peak and changes below the threshold are disregarded and the curvature is deemed flat. An algorithm may be applied to a first LCom signal bit sequence that includes at least one toggle from a first bit value to a second bit value that is different than the first bit value, such as from 0 to 1 or 1 to 0, and a threshold value may be determined from the observed change in signal amplitude.

Equation (1) is an example equation for determining if a curvature exceeds a threshold value.

$$D = \frac{\text{abs}(y_1 - y_0)}{y_{max} - y_{min}} \quad \text{Eq. (1)}$$

In which:
- D=curvature amount
- $y_1$=newest data point
- $y_0$=second to newest data point
- $y_{max}$=max of data points
- $y_{min}$=min of data points Equation (1) is a relatively simple equation included for illustrative purposes. In other examples, other peak detection algorithms known in the art may be used for identifying peaks in the presence of noise. For example, a peak detection algorithm may include one or more of smoothing components, baseline correction components, and peak finding criterion components. Example smoothing components include moving average filter; Savitzky-Golay filter; Gaussian filter; Kaiser window; Continuous Wavelet Transform; Discrete Wavelet Transform; and Undecimated Discrete Wavelet Transform. Example baseline correction components include Monotone minimum; Linear interpolation; Loess; Continuous Wavelet Transform; and Moving average of minima. Example peak finding criterion components include SNR; Detection/Intensity threshold; Slopes of peaks; Local maximum; Shape ratio; Ridge lines; Model-based criterion; and Peak width.

As noted above, the example curvature method disclosed herein assumes the LCom signal has an encoding scheme that averages to idle such that only the entering and exiting bits from a running average window modeling overlapping raster lines will impact the running average. Low frequency disturbances, however, may cause the measured signal to not average to idle. In one example, a low frequency disturbance may be caused by moving a mobile computing device as light data is being recorded. In one example, such low frequency disturbances can be removed from the light receiver data by any one of a number of techniques known in the art, such as: (1) applying a high pass filter; (2) applying a long running average filter, such as the complete length of a bit sequence, to calculate an offset that can be subtracted from the data; or (3) convolving each incoming bit with a similar slope.

Signal Reconstruction Method

FIGS. 8 to 10 show another example for decoding an LCom signal, such as LCom signal 400 (FIG. 4), in which a measured signal is reconstructed in order to decode the signal. FIGS. 8 and 9 illustrate one example for decoding the same LCom signal 400, in which the running average characteristic of a rolling shutter light receiver discussed above is modeled as a running average. In the illustrated example first and second buffers 802, 902 are created, in which each has a time duration "t" that extends from the beginning of light exposure for a first raster line to an end of light exposure of an Nth raster line, in which N is the number of adjacent raster lines that overlap in time. In this example, buffers 802, 902 are modeled as circular buffers that include a first portion 804, 904 of the buffers, also referred to herein as a known portion or decoded portion, that are filled with a decoded or known portion of the LCom signal. Each buffer also includes a second portion 806, 906, also referred to herein as a guess portion. Second portions 806, 906 have a length that is substantially the same as one bit period 402 and are filled with one of the possible bits that could be conveyed by LCom signal 400. Thus, in the illustrated example, buffers 802, 902 are identical except for second portions 806, 906, which are filled with guesses. First portions 804, 904 are both initially filled with a known start sequence or a decoded first bit and subsequently both filled with the same decoded data as the buffers progress through LCom signal 400 and subsequent bits are decoded. In the illustrated example, LCom signal 400 is a Manchester-encoded signal with two possible bit values-0 and 1. Thus, two buffers 802, 902 are used with second portion 806 of buffer 802 filled with a 1 and second portion 906 of buffer 902 filled with a 0. FIGS. 8 and 9 also show a running average 808, 908 to conceptually illustrate a running average calculation of all bit values within buffers 802, 902 as the buffers progress through LCom signal 400. Running averages 808, 908, are, therefore, modeled waveforms that model how the signal values (e.g., bit values or symbol values) stored in buffers 802, 902 would be recorded in light data generated by a light receiver with a rolling shutter.

FIG. 10 is a plot of amplitude versus time over approximately three bit periods 402 and illustrates running averages 808, 908 of buffers 802 and 902 (FIGS. 8, 9) and also illustrates actual data 1002 acquired by a light receiver. First portions 804, 904 are the same since they are both filled with known or previously-decoded bit values, and second portions 806, 906 diverge. In the illustrated example, the actual data 1002 is closer to running average 808, which is a running average of buffer 802, which included a guess of 1, which indicates the bit reflected in the actual data is a 1. Any of a variety of techniques for comparing waveforms may be used for determining which of buffers 802, 902 more closely corresponds to the actual light receiver data. In one example, data points 1004a-c located, for example, at a midpoint of bit period 402 may be identified and each of the running averages 808, 908 of buffers 802, 902 simply subtracted from the actual data 1002, and the subtracted values compared to find the buffer that is in closer agreement. In other examples, other waveform-comparison techniques known in the art may be used, such as Least Squares Fit or Curve Root Sum Squared Differential Area (CRSSDA).

After determining the value of the most recent entering bit, each of buffers 802 and 902 can be advanced one bit, with first portions 804, 904 updated with the most recently-decoded bit, and another comparison made between the buffers and the actual light receiver data to infer the next bit in LCom signal 400. The decoded bit can also be saved to memory. As will be appreciated, in other examples where the LCom signal is encoded with a different communication protocol that contains more than two possible bit values, additional buffers may be used, each including a guess for one of the possible bit values, and a comparison of the actual data to each of the buffers could similarly be made to determine the value of the bit reflected in the light receiver data.

As discussed above in connection with the curvature method, a variety of techniques may be employed for addressing low-frequency disturbances, such as applying a high pass filter or applying a long running average filter. In another example, a more local correction can be made to address low frequency disturbances in the form of an offset correction to the data filled in first portions 804, 904 of first and second buffers 802, 902. For example, after a comparison of buffers 802, 902 are made to the actual data and the buffer that is closer to the actual data is determined to have the correct bit, a difference in signal amplitude between the buffer with the correct guess and the measured data can be applied to the decoded bit added to first portions 804, 904 such that buffers 802, 902 more closely track the actual signal as subsequent bits are decoded. A variety of offset correction techniques may be employed, such as, for example, a proportional-integral-derivative (PID) controller applied to the difference, table values, or a linear equation with fitting constants. In one example, an offset correction can be determined from a linear equation based on data associated with the light receiver.

Figure 11:
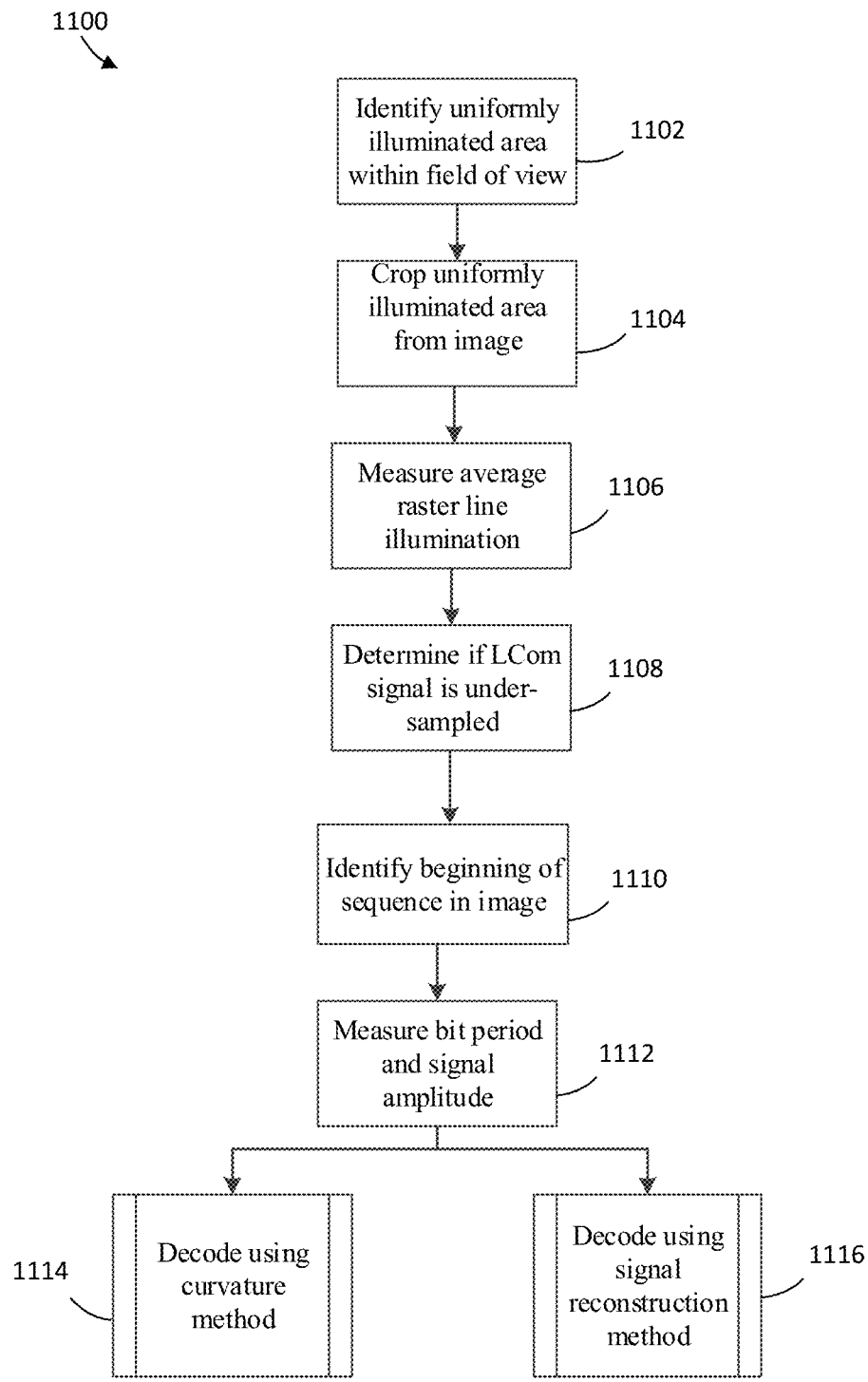
FIG. 11 illustrates a method of decoding an LCom signal with a light receiver employing a rolling shutter scheme.

FIG. 11 illustrates one example method 1100 for decoding an LCom signal using a light receiver that utilizes a rolling shutter light capture scheme. Method 1100 may be performed by a computing device (e.g., computing device 200) that receives an LCom signal from a luminaire (e.g., luminaire 100). In block 1102, the computing device may identify a uniformly-illuminated area within a field of view of an image capture device on the computing device, such as light from an individual luminaire. The image capture device may be, for example, a camera on the computing device. In block 1104, the computing device may crop the uniformly-illuminated area from the image as an area of interest.

In block 1106, the computing device may measure an average raster line illumination in the area of interest. In block 1108, the computing device may determine if an LCom signal that is present in the area of interest is under-sampled. The determination may be performed by comparing the characteristics of the computing device (e.g., the frame rate of the image capture device) to the LCom signal frequency. If the LCom signal is not under-sampled, the computing device may decode the LCom signal directly from the area of interest (not shown in FIG. 11).

If the LCom signal is under-sampled, in block 1110 the computing device may identify a beginning of an LCom signal sequence in the image by, for example, identifying the beginning of a sequence following an extended idle period. If the bit period is not already known, in optional block 1112 the computing device may measure a bit period and signal amplitude by, for example, identifying the first two amplitude peaks following an idle period. With the bit period, initial bit value, and signal amplitude known, one or both of a curvature method 1114 (FIG. 12) and a signal reconstruction method 1116 (FIG. 13) may be employed to decode the LCom signal.

Figure 12:
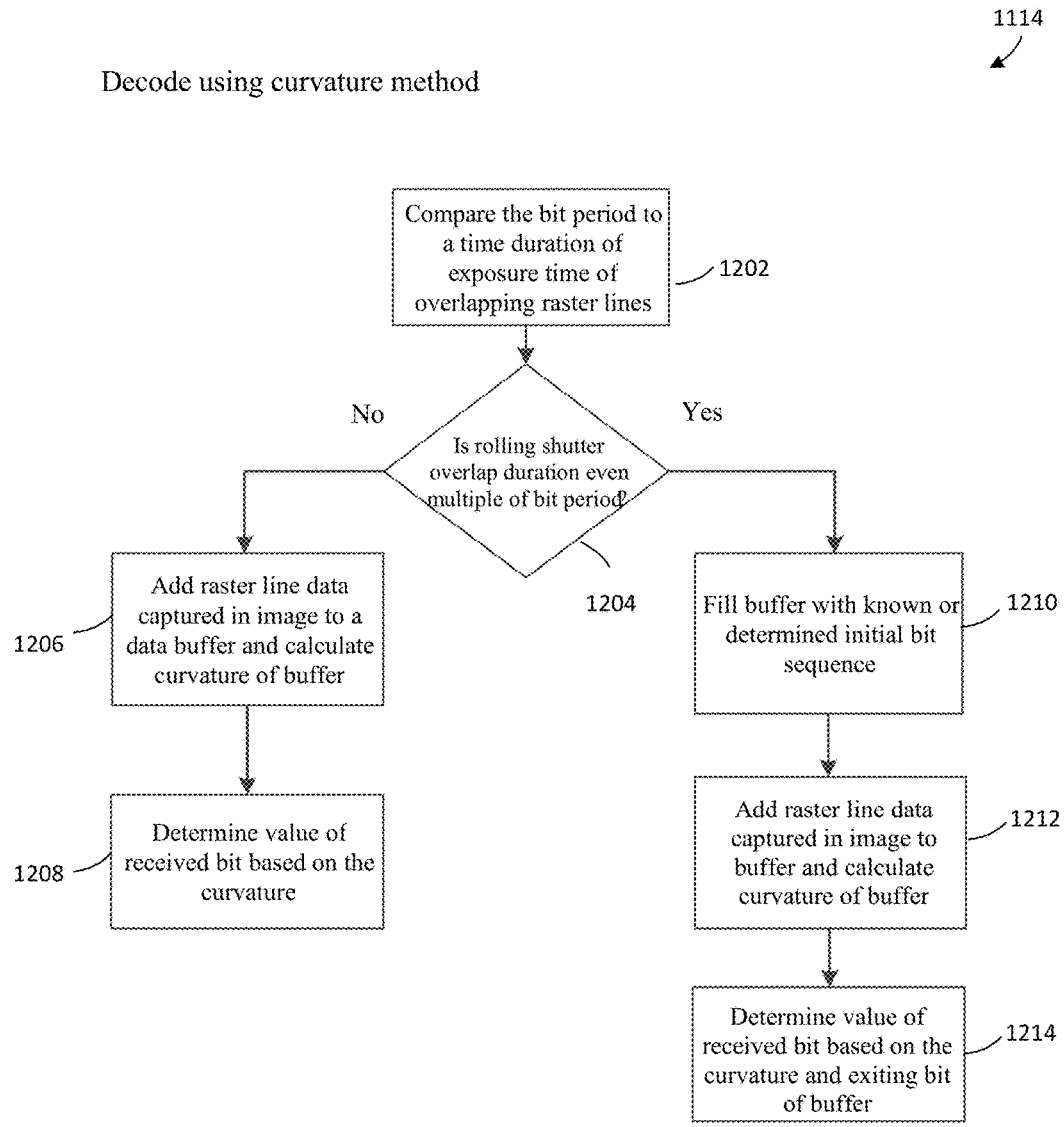
FIG. 12 illustrates a subroutine of the method of FIG. 11 for employing a curvature method.

Referring to FIG. 12, if employing the curvature method 1114, in block 1202 the computing device may compare the bit period to a time duration of exposure time of overlapping raster lines. In block 1204, the computing device may determine if the rolling shutter overlap duration is an even multiple of the bit period.

In response to determining that the rolling shutter overlap duration is a non-even multiple of the bit period (i.e., block 1204="No"), in block 1206 the computing device may add the raster line data captured in the image to a data buffer and calculate the curvature of data in the buffer. The buffer may be filled with the bits received via the LCom signal, and when a new bit is added the oldest bit may be removed (e.g., a FIFO buffer). In block 1208, the computing device may determine the value of the received bit based on the calculated curvature. For example, the computing device may store a lookup table in memory that associates curvature values and entering bit values such as, e.g. Table 2 (above). The decoded bit value can be stored in memory for storing a complete decoded signal, and the algorithm may repeat blocks 1206 and 1208 for each bit received from the luminaire.

In response to determining that the rolling shutter overlap duration is an even multiple of the bit period (i.e., block 1204="Yes"), in block 1210 the computing device may fill a data buffer with a known or determined initial bit sequence. For example, as described above, a predefined starting sequence of a signal may be known, or the first bit of a signal following an idle period may be measured. In block 1212, the computing device may add the raster line data captured in the image to the data buffer and calculate the curvature of data in the buffer. The buffer may be filled with the bits received via the LCom signal, and when a new bit is added the oldest bit may be removed (e.g., a FIFO buffer). In block 1214, the computing device may determine the value of the received bit based on the calculated curvature and the exiting, or last, bit in the data buffer. For example, the computing device may store a lookup table in memory that associates curvature values with entering and exiting bit values such as, e.g. Table 1 (above). As described above, the exiting bit values can be determined from initiating a buffer with a known start sequence or with a first bit measured after an extended idle period between LCom signals. The decoded bit value can be stored in memory for storing a complete decoded signal, and the algorithm may repeat blocks 1210-1214 for each bit received from the luminaire.

Figure 13:
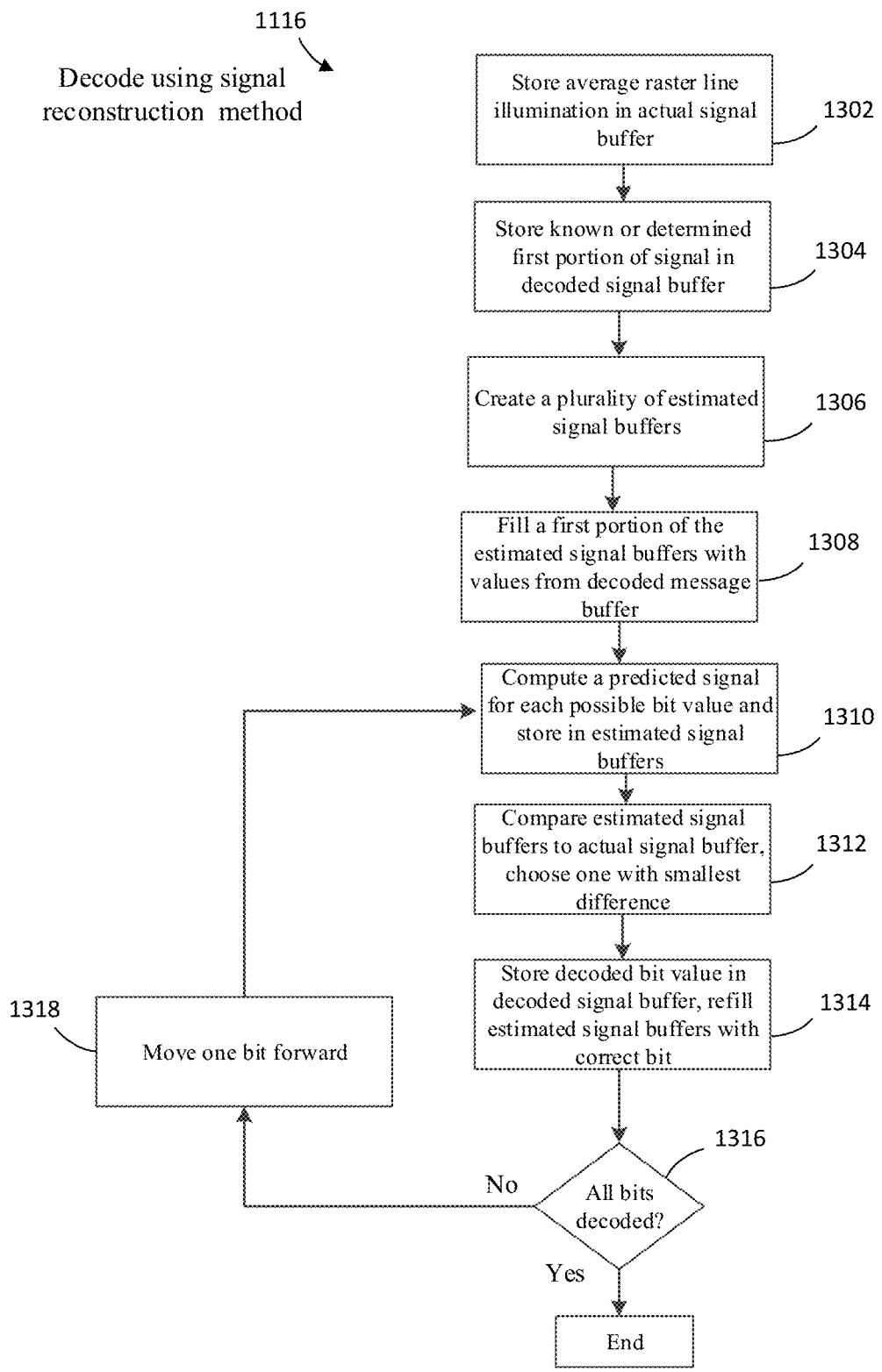
FIG. 13 illustrates a subroutine of the method of FIG. 11 for employing a signal reconstruction method.

Referring to FIG. 13, if employing the signal reconstruction method 1116, in block 1302 the computing device may store average raster line illumination data in an actual signal buffer. In block 1304, the computing device may store a known or determined first portion of the LCom signal in a decoded signal buffer. For example, as described above, a predefined starting sequence of a signal may be known, or the first bit of a signal following an idle period may be measured. In block 1306, the computing device may create a plurality of modeled data buffers, with each of the modeled data buffers corresponding to one of a plurality of possible bit values associated with a particular LCom signal encoding scheme.

In block 1308, the computing device may fill a first portion of each of the modeled data buffers with the same known or determined first portion of a signal that was stored in the decoded signal buffer in block 1304. In block 1310, the computing device may compute a predicted signal for each possible bit value and store each of the predicted signals in a different modeled data buffer. In block 1312, the computing device may compare each of the modeled data buffers to the actual signal buffer. The computing device may choose the modeled data buffer that has the smallest difference from the actual data buffer at a common point in time. In other words, the computing device may determine which predicted signal is correct by determining which predicted signal best matches the actual received signal. The common point in time may be, for example, half way through a signal period.

In block 1314, the computing device may store the decoded bit value in the decoded signal buffer as well as the estimated signal buffer(s) that contained the incorrect guess. In block 1316, the computing device may determine whether all received bits have been decoded. In response to determining that not all bits have been decoded (i.e., block 1316="No"), the computing device may return to block 1310 and compute predicted signals for each possible bit value of the next received bit. In response to determining that all bits have been decoded (i.e., block 1316="Yes"), the computing device may end the LCom decoding process.

In one example implementation, a given space may include, e.g., two hundred luminaires (such as luminaires 100 of FIGS. 1B and 2), with each luminaire transmitting an LCom signal with a unique ID. A customer entering the space with a mobile device (e.g., computing device 200 of FIG. 3) can open up a navigation application, which can trigger a camera on the mobile device (e.g., image capture devices 250). Per design, the luminaires are transmitting at period of 0.5 ms (frequency of 2 kHz). The user's camera is set at 30 frames per second with a horizontal resolution of 1,000 raster lines producing an unfiltered sampling frequency of 30 kHz. However, the camera employs a rolling shutter image capturing method, in which 50 raster lines overlap during image capture. This creates a low pass filter effect, which can be modeled as a running average. The mobile device navigation application checks these parameters (LCom signal and effective sampling rate) and computes an effective sampling rate of 600 Hz and determines this is below an acceptable sampling rate, e.g., below the Nyquist frequency of 4 kHz needed to sample 2 kHz, or a higher minimum frequency of 6-15 kHz.

After determining standard sampling of the signal will not produce an acceptable result, the mobile application can then apply either the curvature method or the signal reconstruction method, or can apply both methods for an increased level of certainty. If applying the curvature method, the mobile device application determines whether the effective running average window is an even multiple or substantially an even multiple within a threshold value of the LCom period. If not within the threshold, the application can select the non-even multiple algorithm, in which history of the signal is not used and data points spanning one period are analyzed at a given time to determine the curvature and associated bit value of a given bit.

If the running average window is within the even multiple threshold, one option would be for the application to instruct the mobile device camera to adjust one or more settings, such as shutter speed, frame rate, etc., that affect light capture timing such that the window is not an even multiple of the signal period. If such an adjustment is not optimal or not possible, the application can select the even multiple algorithm in which the value of the first bit in an LCom signal sequence is determined to fully decode the signal. Knowing there is a long idle time between each group of bits, the measured output of the sensor after seeing the first bit can be used to determine the value of the first bit transmitted because the running average window will be filled with idle values such that the output of the sensor will exactly resemble the first bit.

If the application selects the signal reconstruction method, modeled data buffers are created and initialized with a first bit or a predefined starting sequence of the LCom signal. As with the curvature method, if not already known, the LCom period and first bit value can be measured from the first measured bit after an idle period. The mobile application can then collect the next bit, and the modeled data buffers can each be filled with a different guess of the next possible bit value and the modeled data buffers can be compared to the actual data to determine the correct guess. The correct guess can be stored in a decoded signal buffer and the application can advance to the next received bit.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method for decoding a light-based communication (LCom) signal utilizing a rolling shutter light receiver having overlapping raster lines, the method comprising:
   receiving light data encoded with the LCom signal;
   storing a portion of the light data in a data buffer as the light data is received, wherein the portion of the light data comprises an exiting bit in the data buffer and an entering bit in the data buffer;
   determining a curvature of the data buffer; and
   determining a value of the entering bit in the portion of the light data based at least in part on the curvature.

2. The method of claim 1, further comprising:
   determining whether an exposure time duration of the overlapping raster lines is an integer multiple of a bit period of the LCom signal;
   determining the value of the entering bit based on the curvature in response to determining that the exposure time duration of the overlapping raster lines is not an integer multiple of the bit period.

3. The method of claim 2, further comprising:
   determining the value of the entering bit based on the curvature and the value of the exiting bit in response to determining that the exposure time duration of the overlapping raster lines is an integer multiple of the bit period.

4. The method of claim 1, wherein a value of the exiting bit is determined from measuring a first bit value captured by the light receiver following an extended idle period in the LCom signal.

5. The method of claim 1, further comprising:
   calculating a threshold value for determining whether the curvature is flat or changing; and
   comparing the threshold value to the calculated curvature to determine the curvature.

6. The method of claim 1, further comprising determining whether the LCom signal is encoded with an average-to-idle encoding scheme.

7. The method of claim 1, determining the curvature of the data buffer comprises:

calculating a running average of a value of the exiting bit and a value of the entering bit; and
determining whether the running average is flat, a positive peak, or a negative trough.

8. The method of claim 7, determining the curvature of the data buffer further comprises:
calculating a threshold value for determining whether the curvature is flat or changing; and
comparing the threshold value to the running average to determine the curvature.

9. A method for decoding a light-based communication (LCom) signal utilizing a rolling shutter light receiver having overlapping raster lines, the method comprising:
configuring a plurality of modeled data buffers, wherein each of the plurality of modeled data buffers has a length based on an exposure time duration of the overlapping raster lines;
initializing a first portion of each of the plurality of modeled data buffers with a first portion of the LCom signal;
filling a second portion of each of the plurality of modeled data buffers with a possible signal value, wherein each of the plurality of modeled data buffers has a different possible signal value in the second portion;
calculating a modeled waveform for each of the plurality of modeled data buffers based on the signal values stored in the first portion and the second portion of each of the plurality of modeled data buffers;
comparing each of the modeled waveforms to light data from the light receiver to identify a modeled data buffer in closest agreement with the light data; and
determining that the possible signal value of the modeled data buffer in closest agreement with the light data is an actual signal value of the LCom signal.

10. The method of claim 9, wherein the first portion of the LCom signal is at least one of a predefined starting sequence or a first signal value captured by the light receiver following an extended idle period in the LCom signal.

11. The method of claim 9, further comprising:
advancing each of the plurality of modeled data buffers by one LCom signal period; and
updating the first portion of each of the plurality of modeled data buffers with the actual signal value of the LCom signal.

12. The method of claim 9, further comprising:
applying an offset correction to data in the first portion of each of the plurality of modeled data buffers based on a difference between the light data and the modeled data buffer in closest agreement with the light data.

13. A computing device, comprising:
a light receiver configured to receive light data encoded with a light-based communication (LCom) signal, wherein the light receiver comprises a rolling shutter light receiver having overlapping raster lines; and
a processor coupled to the light receiver and configured to:
store a portion of the light data in a data buffer as the light data is received, wherein the portion of the light data comprises an exiting bit in the data buffer and an entering bit in the data buffer;
determine a curvature of the data buffer; and
determining a value of the entering bit in the portion of the light data based at least in part on the curvature.

14. The computing device of claim 13, wherein the processor is further configured to:

determine whether an exposure time duration of the overlapping raster lines is an integer multiple of a bit period of the LCom signal;
determine the value of the entering bit based on the curvature in response to determining that the exposure time duration of the overlapping raster lines is not an integer multiple of the bit period.

15. The computing device of claim 14, wherein the processor is further configured to:
determine the value of the entering bit based on the curvature and the value of the exiting bit in response to determining that the exposure time duration of the overlapping raster lines is an integer multiple of the bit period.

16. The computing device of claim 13, wherein a value of the exiting bit is determined from measuring a first bit value captured by the light receiver following an extended idle period in the LCom signal.

17. The computing device of claim 13, wherein the processor is further configured to:
calculate a threshold value for determining whether the curvature is flat or changing; and
compare the threshold value to the calculated curvature to determine the curvature.

18. The computing device of claim 13, wherein the processor is further configured to:
determine whether the LCom signal is encoded with an average-to-idle encoding scheme.

19. The computing device of claim 13, wherein the processor is further configured to determine the curvature of the data buffer by:
calculating a running average of a value of the exiting bit and a value of the entering bit; and
determining whether the running average is flat, a positive peak, or a negative trough.

20. The computing device of claim 19, wherein the processor is further configured to determine the curvature of the data buffer by:
calculating a threshold value for determining whether the curvature is flat or changing; and
comparing the threshold value to the running average to determine the curvature.

21. A computing device, comprising:
a light receiver configured to receive light data encoded with a light-based communication (LCom) signal, wherein the light receiver comprises a rolling shutter light receiver having overlapping raster lines; and
a processor coupled to the light receiver and configured to:
configure a plurality of modeled data buffers, wherein each of the plurality of modeled data buffers has a length based on an exposure time duration of the overlapping raster lines;
initialize a first portion of each of the plurality of modeled data buffers with a first portion of the LCom signal;
fill a second portion of each of the plurality of modeled data buffers with a possible signal value, wherein each of the plurality of modeled data buffers has a different possible signal value in the second portion;
calculate a modeled waveform for each of the plurality of modeled data buffers based on the signal values stored in the first portion and the second portion of each of the plurality of modeled data buffers;
compare each of the modeled waveforms to light data from the light receiver to identify a modeled data buffer in closest agreement with the light data; and determine that the possible signal value of the modeled data buffer in closest agreement with the light data is an actual signal value of the LCom signal.

22. The computing device of claim 21, wherein the first portion of the LCom signal is at least one of a predefined starting sequence or a first signal value captured by the light receiver following an extended idle period in the LCom signal.

23. The computing device of claim 21, wherein the processor is further configured to:
   advance each of the plurality of modeled data buffers by one LCom signal period; and
   update the first portion of each of the plurality of modeled data buffers with the actual signal value of the LCom signal.

24. The computing device of claim 21, wherein the processor is further configured to:
   apply an offset correction to data in the first portion of each of the plurality of modeled data buffers based on a difference between the light data and the modeled data buffer in closest agreement with the light data.

* * * * *